(12) United States Patent
Huang et al.

(10) Patent No.: US 8,059,098 B2
(45) Date of Patent: Nov. 15, 2011

(54) ELECTRONIC DEVICE WITH AUTOMATIC SWITCHING INPUT INTERFACES AND SWITCHING METHOD THEREOF

(75) Inventors: Yun-Liang Huang, Taipei (TW); Huan-Chung Hsu, Taipei (TW)

(73) Assignee: Inventec Corp., Taipei (TW)

( * ) Notice: Subject to any disclaimer, the term of this patent is extended or adjusted under 35 U.S.C. 154(b) by 695 days.

(21) Appl. No.: 12/171,015

(22) Filed: Jul. 10, 2008

(65) Prior Publication Data

US 2009/0091537 A1    Apr. 9, 2009

(30) Foreign Application Priority Data

Oct. 3, 2007 (TW) ................................ 96137147 A

(51) Int. Cl.
*G06F 3/02* (2006.01)
(52) U.S. Cl. ..... 345/169; 345/156; 345/173; 361/679.3; 361/679.56; 455/556.2; 710/73
(58) Field of Classification Search .................. 345/169, 345/173, 156, 172; 455/566, 556.2; 361/679.3, 361/679.56; 463/37; 710/73
See application file for complete search history.

(56) References Cited

U.S. PATENT DOCUMENTS

| | | | |
|---|---|---|---|
| 6,697,083 B1* | 2/2004 | Yoon | 345/658 |
| 2004/0100511 A1* | 5/2004 | Wong et al. | 345/866 |
| 2004/0175020 A1* | 9/2004 | Bradski | 382/103 |
| 2006/0019714 A1* | 1/2006 | Lee et al. | 455/566 |
| 2007/0129099 A1* | 6/2007 | Lee | 455/550.1 |

* cited by examiner

*Primary Examiner* — Lun-Yi Lao
*Assistant Examiner* — Sosina Abebe
(74) *Attorney, Agent, or Firm* — James W. Huffman

(57) ABSTRACT

An electronic device with automatic switching input interfaces and a switching method thereof. The electronic device supports an Advanced Configuration Power Interface (ACPI), and includes a display unit, a storage unit, a memory unit, and an embedded controller. The display unit can be changed to a first position or a second position, and sends a signal to an embedded control unit when the display unit is at different positions. A management program running in the electronic device queries the ACPI and the embedded control unit to check the position and state of the display unit, so as to automatically load and run a corresponding program of a virtual input interface or a physical input interface into the memory unit, and remove the other program from the memory unit at the same time.

20 Claims, 8 Drawing Sheets

ELECTRONIC DEVICE WITH AUTOMATIC SWITCHING INPUT INTERFACES AND SWITCHING METHOD THEREOF

CROSS-REFERENCE TO RELATED APPLICATIONS

This non-provisional application claims priority under 35 U.S.C. §119(a) on Patent Application No(s). 096137147 filed in Taiwan, R.O.C. on Oct. 3, 2007 the entire contents of which are hereby incorporated by reference.

BACKGROUND OF THE INVENTION

1. Field of Invention

The present invention relates to an electronic device with automatic switching input interfaces. More particularly, the present invention relates to an electronic device that can automatically load and run a corresponding program of a virtual input interface or a physical input interface into a memory unit, and remove the other program from the memory unit when a display unit of the electronic device is at different positions.

2. Related Art

An electronic device with a changeable display unit, e.g., personal digital assistant (PDA), tablet PC, or cell phone can provides a corresponding virtual input interface (e.g., an input interface provided by a touch screen) and physical input interface (e.g., the physical keyboard) when the display unit is changed to different positions, for the user to input or operate data conveniently.

When the display unit of this electronic device is changed to one of the positions, the physical input interface is generally shielded, and the user must a specific hot key or switch means to enable the virtual input interface for inputting or operating data. For example, a notebook with a touch display unit can be used as a tablet computer without a keyboard after the display unit is rotated and folded back down by the user. However, when the notebook becomes the tablet computer, the original physical keyboard and the hot keys or function keys on the physical keyboard will be shielded by the display unit and cannot be used. Thus, the user must uses a specific hot key or switch means to enable the virtual input interface, so as to display a virtual keyboard on the display unit to substitute the original physical keyboard, which is quite inconvenient for the user.

On the other hand, usually, a corresponding program of the virtual input interface of this electronic device is loaded into the memory unit at the moment that the electronic device is booted. When the display unit switches from a first position to a second position, the electronic device can rapidly execute a corresponding program of the virtual input interface. However, when the physical input interface is used, a corresponding program of the virtual input interface remaining in the memory unit will cause a waste of the memory resource. Moreover, as a corresponding program of the virtual input interface is loaded into the memory unit at the moment that the electronic device is booted, the time for booting up the electronic device becomes longer.

SUMMARY OF THE INVENTION

Accordingly, the present invention is directed to an electronic device capable of automatically enabling a physical input interface or a virtual input interface according to a current position of a display unit.

In order to achieve the aforementioned objective, the electronic device with automatic switching input interfaces of the present invention includes a changeable display unit, a storage unit, a memory unit, and an embedded control unit. The display unit can be changed to at least a first position or a second position. The display unit sends a trigger signal to the embedded control unit according to different positions. The storage unit stores a corresponding program of a virtual input interface or a physical input interface. When a corresponding program of the virtual input interface is executed, a corresponding program of the virtual input interface is loaded into the memory unit. The embedded control unit is electrically connected to the display unit and the memory unit, and determines whether or not to load/remove a corresponding program of the virtual input interface into/from the memory unit according to a trigger signal. When a corresponding program of the virtual input interface is loaded into the memory unit, the virtual input interface is displayed on the display unit.

In another viewpoint, the present invention is directed to a method of automatically enabling a corresponding physical input interface or virtual input interface according to a current position of a display unit of an electronic device.

In order to achieve the aforementioned objective, the switching method of automatic switching input interfaces of an electronic device includes the following steps. When at a first position, a first trigger signal is sent. When at a second position, a second trigger signal is sent. When an electronic device switches to the first position, a corresponding program of a virtual input interface is executed to display a virtual input interface on a display unit, and meanwhile a corresponding program of a physical input interface is removed from a memory unit at the same time. When the electronic device switches to the second position, a corresponding program of the virtual input interface is removed from the memory of the electronic device, and a corresponding program of the physical input interface is loaded and executed into the memory.

The present invention sends different trigger signals to the embedded control unit when the display unit switches its positions, and the embedded control unit loads/removes the virtual input interface and its corresponding program according to the received trigger signal. In this manner, when the display unit is at the first position, the display unit will automatically display the virtual input interface, and the user does not need to trigger other keys or switches. Moreover, when the display unit is at the second position, the virtual input interface will not occupy the memory capacity of the electronic device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention provides an electronic device with automatic switching input interfaces. The electronic device provides a physical input interface and a virtual input interface, and automatically enables the function of the physical input interface or the virtual input interface according to the position of a display unit. The physical input interface, for example, is a physical keyboard, hot key, or other physical keys with similar functions. The virtual input interface, for example, is an input area, virtual keyboard, or virtual hot key in the touch display unit. The electronic device may be, but not limited to, a personal digital assistant (PDA), tablet PC, cell phone, or notebook.

Figure 1:
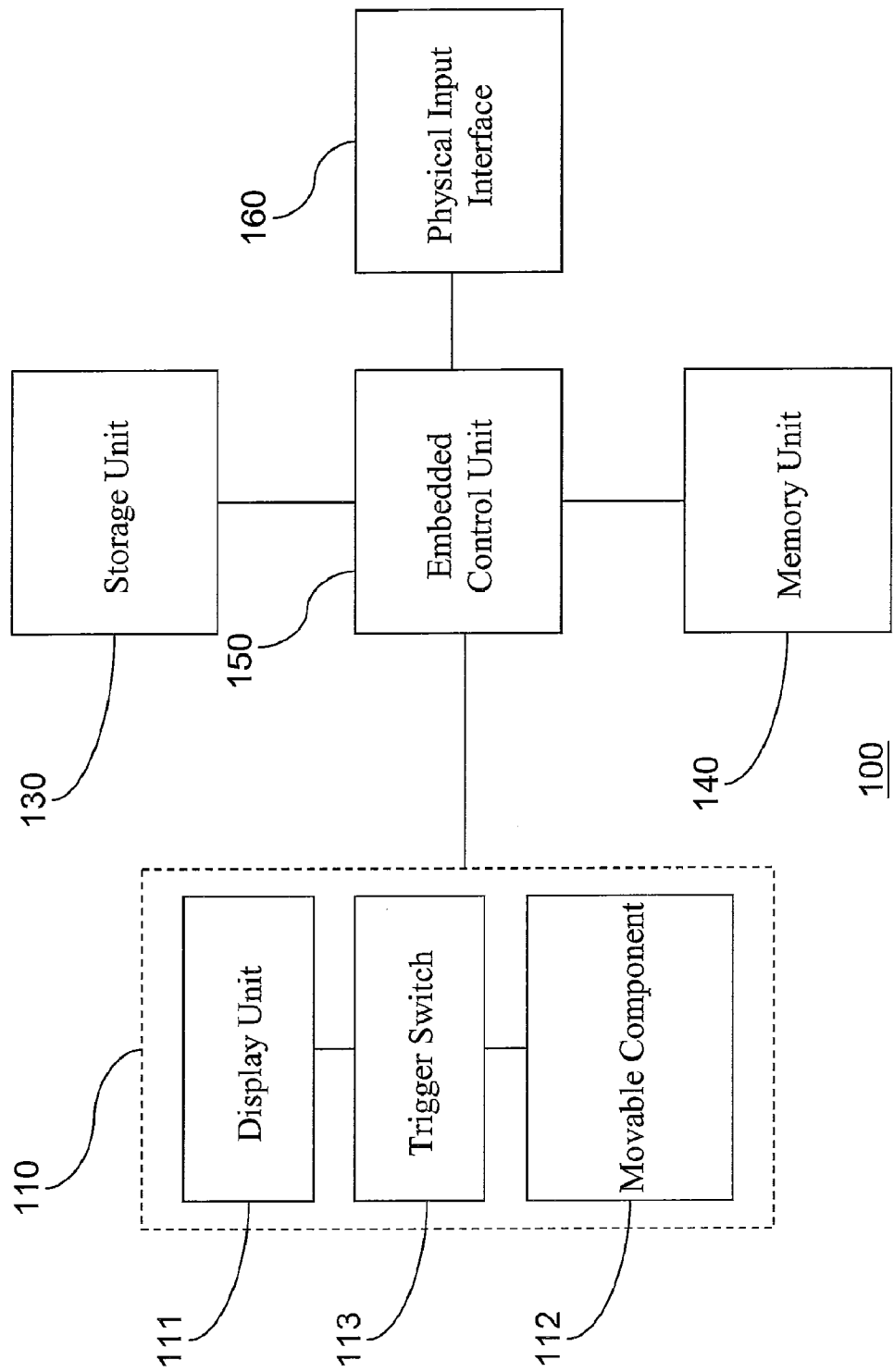
FIG. 1 is a block diagram of a system of the present invention.

FIG. 1 is a block diagram of a system of the present invention. Referring to FIG. 1, the electronic device 100 with automatic switching input interfaces includes a display unit 110, a storage unit 130, a memory unit 140, an embedded control unit 150, a physical input interface 160, and a management program 170.

The display unit 110 includes a display unit 111, a movable component 112, and a trigger switch 113. The display unit 110 may at least be changed to a first position or a second position. The display unit 110 is a LCD screen, a LCD touch screen, or a backlight LCD screen. The virtual input interface may adopt different input modes according to different display screen types. For example, the virtual input interface may be a keyboard, or a single function hot key. The movable component 112 of the display unit 110 allows the display unit 110 to switch from the first position to the second position. The movable component 112 may be, but not limited to, a shaft, hinge, or slide rail. In a preferred embodiment of the present invention, the management program 170 is used to monitor the current active state of the display unit 110 received by the operating system to determine the current position of the display unit 110.

If the movable component 112 is a shaft, the display unit 110 is rotated to switch from the first position to the second position. If the movable component 112 is a hinge, the display unit 110 is folded to switch from the first position to the second position. If the movable component 112 is a slide rail, the display unit 110 slides to switch from the first position to the second position. When the display unit switches from the second position to the first position, the trigger switch 113 will send a first trigger signal. When the display unit switches from the first position to the second position, the trigger switch 113 will send a second trigger signal.

The storage unit 130 is electrically connected to the embedded control unit 150 for storing a corresponding program of the virtual input interface. When a corresponding program of the virtual input interface is executed, a corresponding program of the input interface is loaded into the memory unit 140. The embedded control unit 150 is electrically connected to the physical input interface 160, the display unit 110, and the memory unit 140 respectively, and determines whether or not to load/remove a corresponding program of the virtual input interface into/from the memory unit 140 according to the trigger signal. When a corresponding program of the virtual input interface is loaded into the memory unit 140, the virtual input interface is displayed on the display unit 110.

The embedded control unit 150 is an embedded controller. When the display unit 110 switches its position, a trigger signal will be sent to the embedded control unit 150 when the display unit 110 switches positions. The embedded control unit 150 will query an ACPI BIOS to check if the display unit 110 is in a standby state currently. The embedded control unit 150 then reports the current normal operating state or standby state of the display unit 110 to the operating system. Then, the management program 170 residing in the operating system receives the state report sent by the embedded control unit 150, so as to determine the current position of the display unit 110.

Figure 2A:
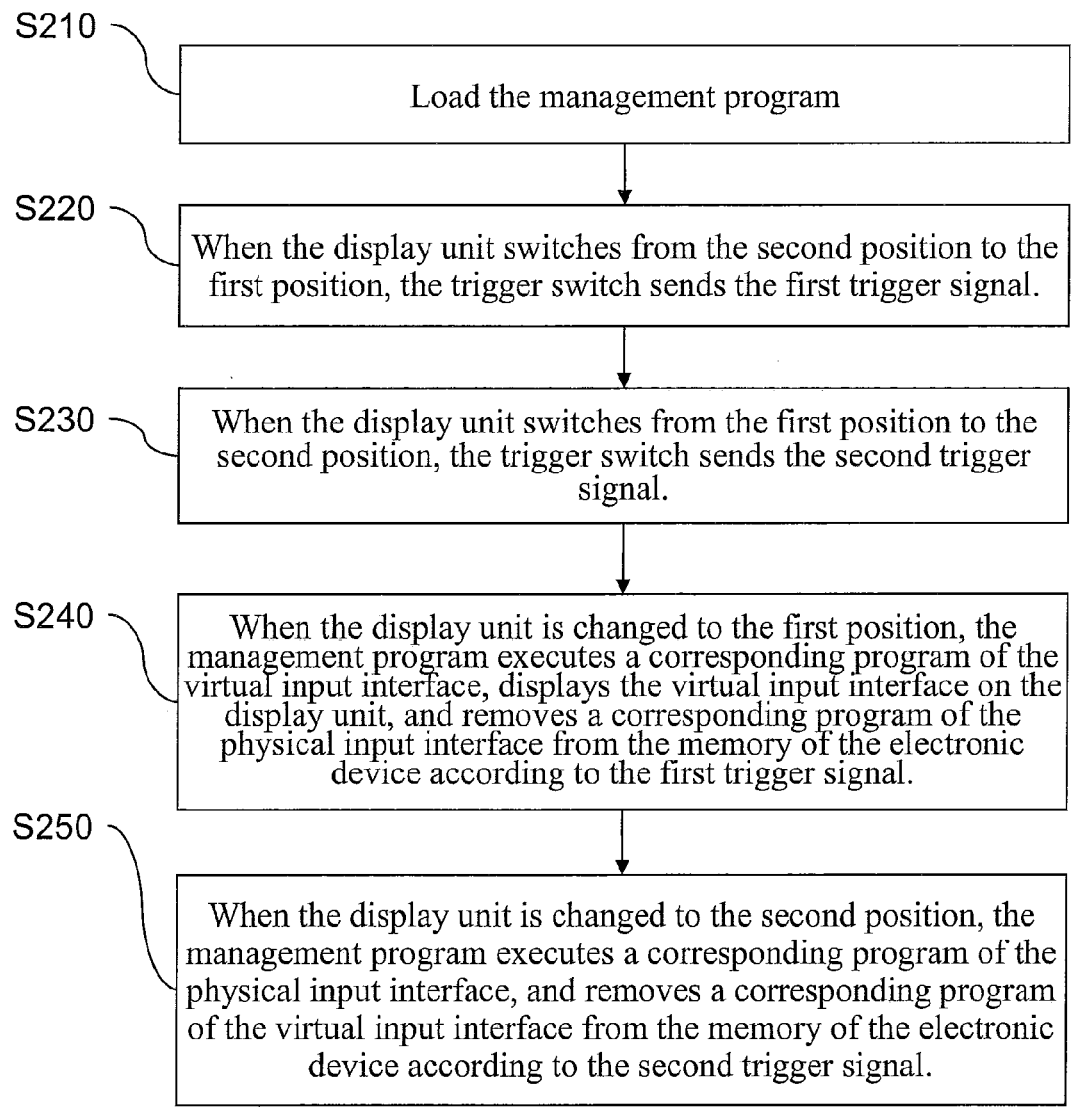
FIG. 2A is a flow chart of the operation of the present invention.

In order to illustrate the operation of the above components in detail, a switching method of the virtual input interface is described below. FIG. 2A is a flow chart of the operation of the present invention. Referring to FIG. 2A, the switching method includes the following steps. The management program is executed (step S210). When the display unit switches from the second position to the first position, the trigger switch sends the first trigger signal (step S220). When the display unit switches from the first position to the second position, the trigger switch sends the second trigger signal (step S230).

When the display unit is changed to the first position, the management program executes a corresponding program of a virtual keyboard according to the first trigger signal, displays the virtual keyboard on the display unit, and removes a corresponding program of the physical input interface from a memory (step S240). When the display unit is changed to the second position, the management program executes a corresponding program of the physical input interface according to the second trigger signal, and removes a corresponding program of the virtual input interface from the memory of the electronic device (step S250).

It should be noted that the embedded control unit 150 of the present invention queries the Advanced Configuration Power Interface BIOS (ACPI BIOS). The embedded control unit 150 looks up control events in the ACPI BIOS, so as to check if the electronic device is in the standby state or operating state currently. ACPI is a set of AML (ACPI Machine Language), which is a binary pseudo-code format. Generally speaking, ACPI uses AML to develop the management and control over power events, and an AML interpreter in the operating system is responsible for analyzing the AML. The operating system uses ACPI drivers to detect all attributes of the computer peripherals. In addition, the ACPI further has a set of ASL (ACPI Source Language) for developers to describe the systems that they developed. ASL and AML can be used together to write programs. The program written in the ASL and AML is stored in the BIOS memory, and the content thereof is then loaded into the memory after booting up. The AML interpreter interprets the content.

Figure 2B:
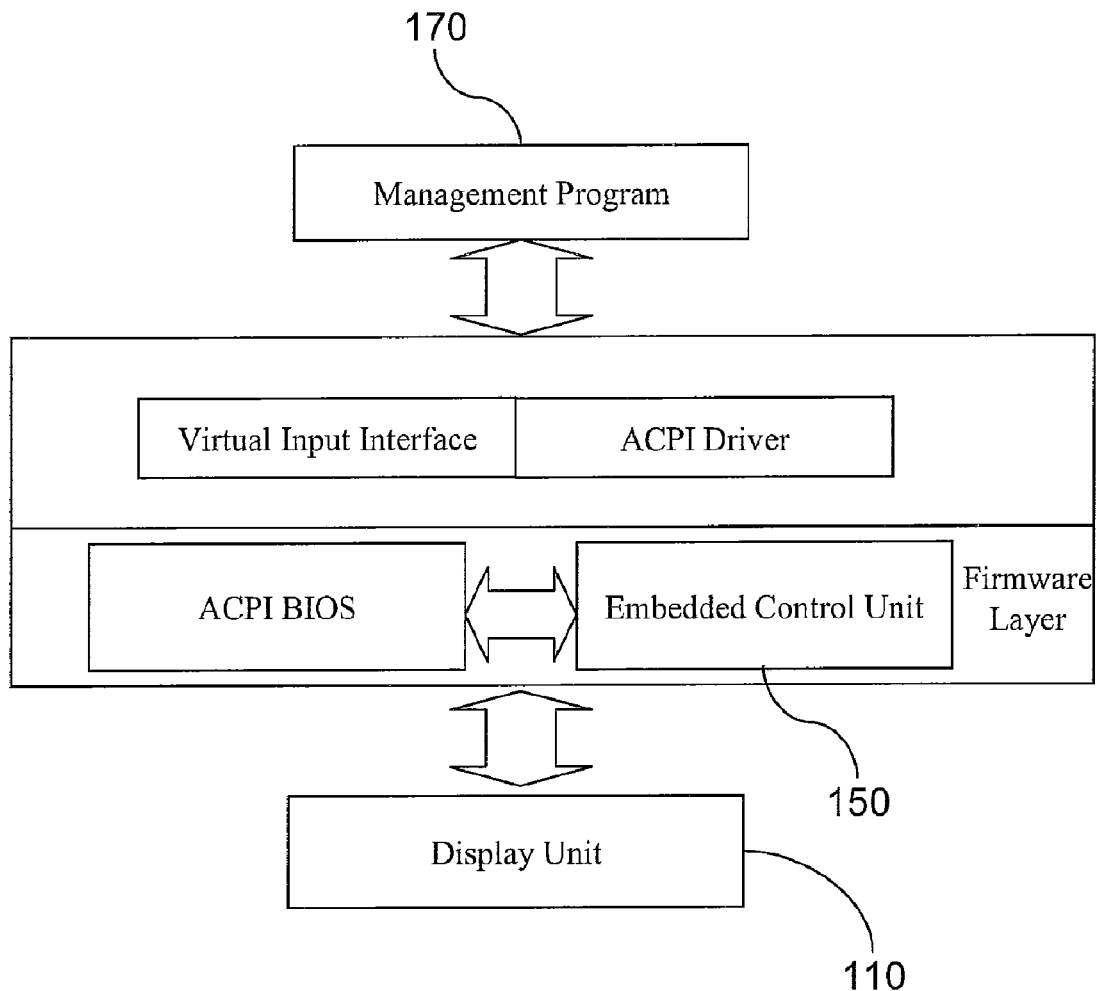
FIG. 2B is a schematic view of an operating architecture of the present invention.

FIG. 2B is a schematic view of an operating architecture of the present invention using ACPI. Referring to FIG. 2B, the present invention uses the embedded control unit 150 to receive the trigger signals sent when the display unit 110 switches to different positions, so as to detect the position of the display unit 110. The embedded control unit 150 when receiving the trigger signals determines the active state of the display unit 110 according to the control events provided by the ACPI BIOS. After that, the embedded control unit 150 sends a message to the operating system. When the management program 170 in the operating system receives the message, the management program 170 queries the ACPI BIOS for acquire the current position of the display unit 110. Then, the management program 170 executes a corresponding program of the position of the display unit 110.

For example, when the display unit 110 switches to the first position, the resident program after receiving the first trigger signal informs the operating system to remove the virtual input interface and its corresponding program from the memory unit 140, and meanwhile to load the physical input interface and its corresponding program into the memory unit 140, and vice versa.

When the embedded control unit 150 receives the change of the position of the display unit 110, the embedded control unit 150 queries the ACPI BIOS for check the display unit 110 is in the operating or standby state. The embedded control unit 150 then sends a message to the operating system according to the received trigger signal. When the resident program in the operating system receives the message, the operating system loads a corresponding program of the virtual/physical input interface or the physical input interface of the display unit 110 into the memory unit 140, and removes the other corresponding program.

Figure 3A:
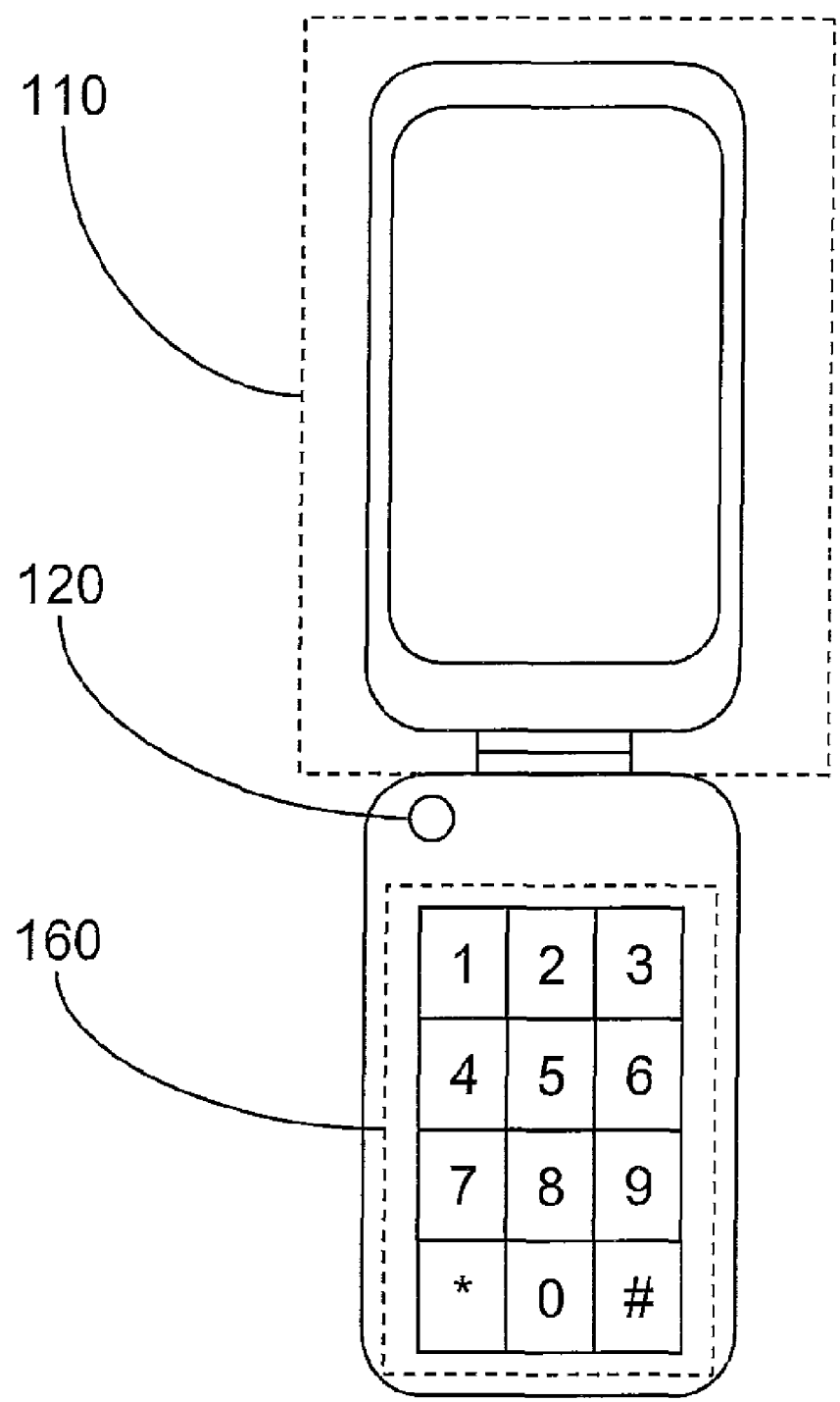
FIG. 3A is a schematic view of a virtual input interface displayed in a cell phone.
Figure 3B:
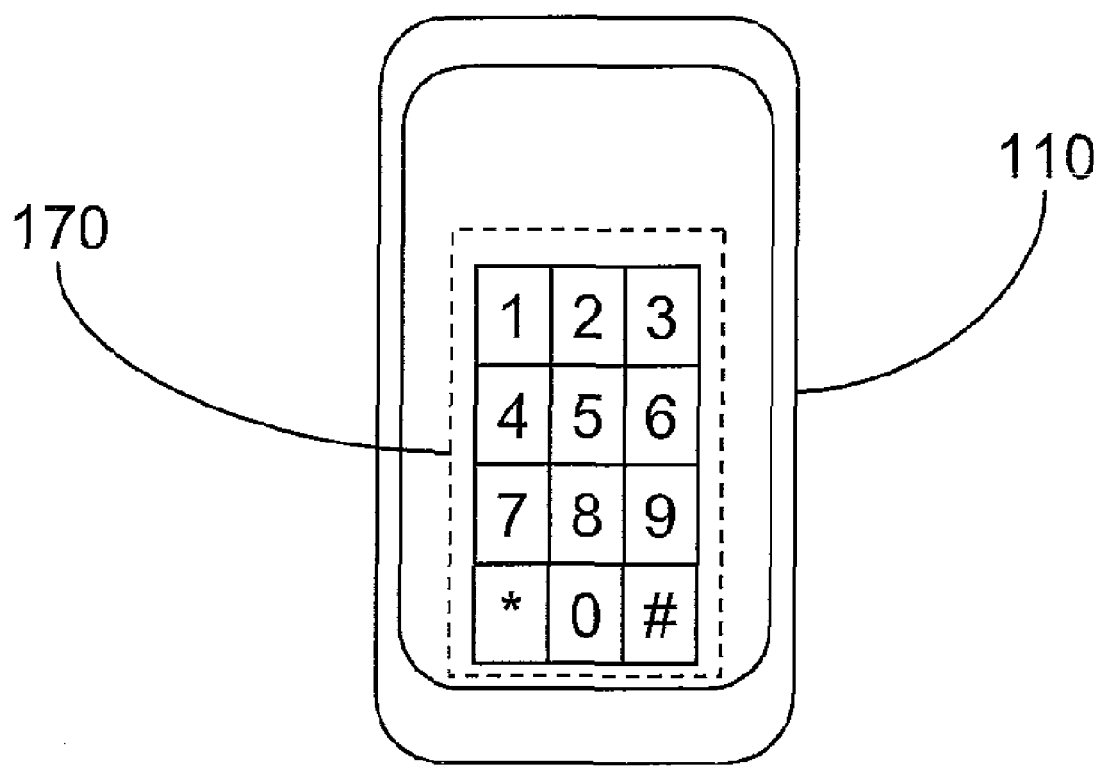
FIG. 3B is a schematic view of a virtual input interface displayed in a cell phone.

FIGS. 3A and 3B are schematic views of the virtual input interface displayed in a cell phone. In FIG. 3A, a cell phone that can be folded around a shaft is taken as an example to illustrate this embodiment. However, the present invention is not limited to this implementation. In FIG. 3A, the display unit 110 and the physical input interface 160 of the cell phone are shown.

When the display unit 110 of the cell phone switches to the second position as shown in FIG. 3A, the cell phone uses the physical input interface 160 as a user input interface. When the display unit 110 of the cell phone switches to the first position as shown in FIG. 3B, the display unit 110 will send a first trigger signal to the embedded control unit 150 in the course of switching, and the management program 170 will check the display position of the display unit 110 according to the first trigger signal (refer S220 and S230).

When the cell phone switches to the first position, the cell phone executes a corresponding program of the virtual input interface, and the embedded control unit 150 loads the virtual input interface and the corresponding program into the memory unit 140 and displays the virtual input interface on the display unit 110 (refer S240). Moreover, when the cell phone switches to the first position, the cell phone removes a corresponding program of the physical input interface 160 from the memory. If the cell phone switches from the first position in FIG. 3B to the second position in FIG. 3A, the embedded control unit 150 removes the virtual input interface and its corresponding program from the memory unit 140 (refer S250), and the memory unit 140 only stores a set of key programs at the same time.

Figure 4A:
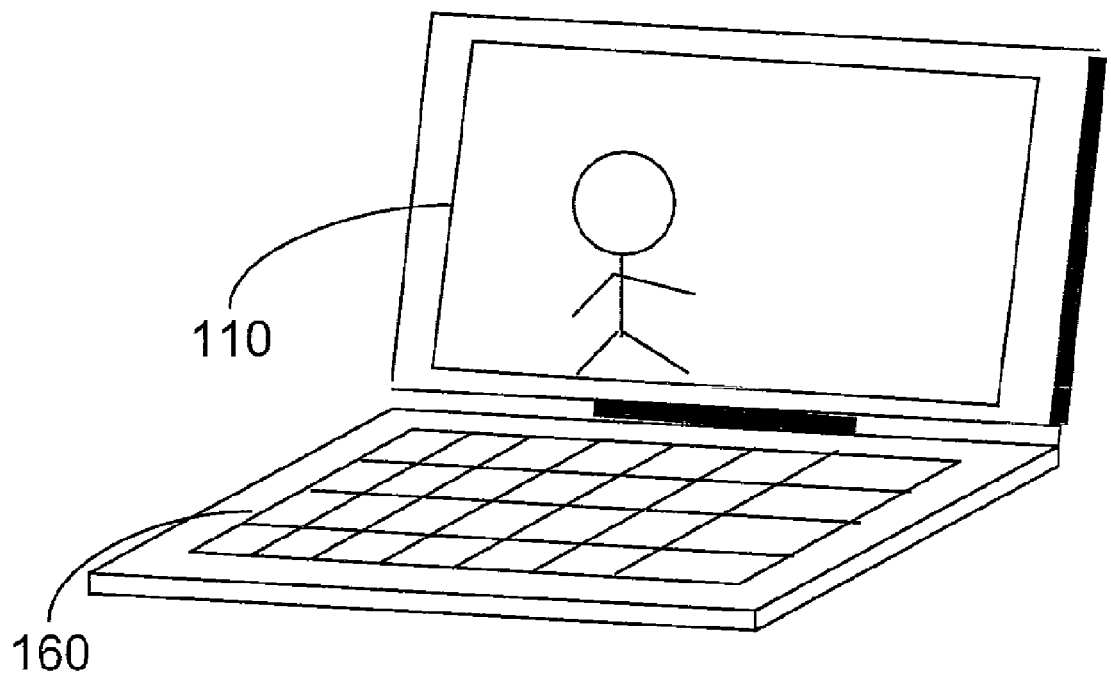
FIG. 4A is a schematic view of a notebook when being unfolded.
Figure 4B:
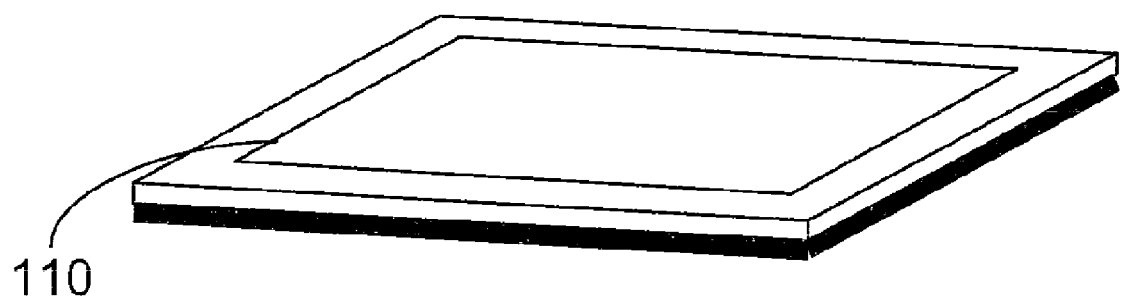
FIG. 4B is a schematic view of the notebook when being folded into a tablet PC.
Figure 4C:
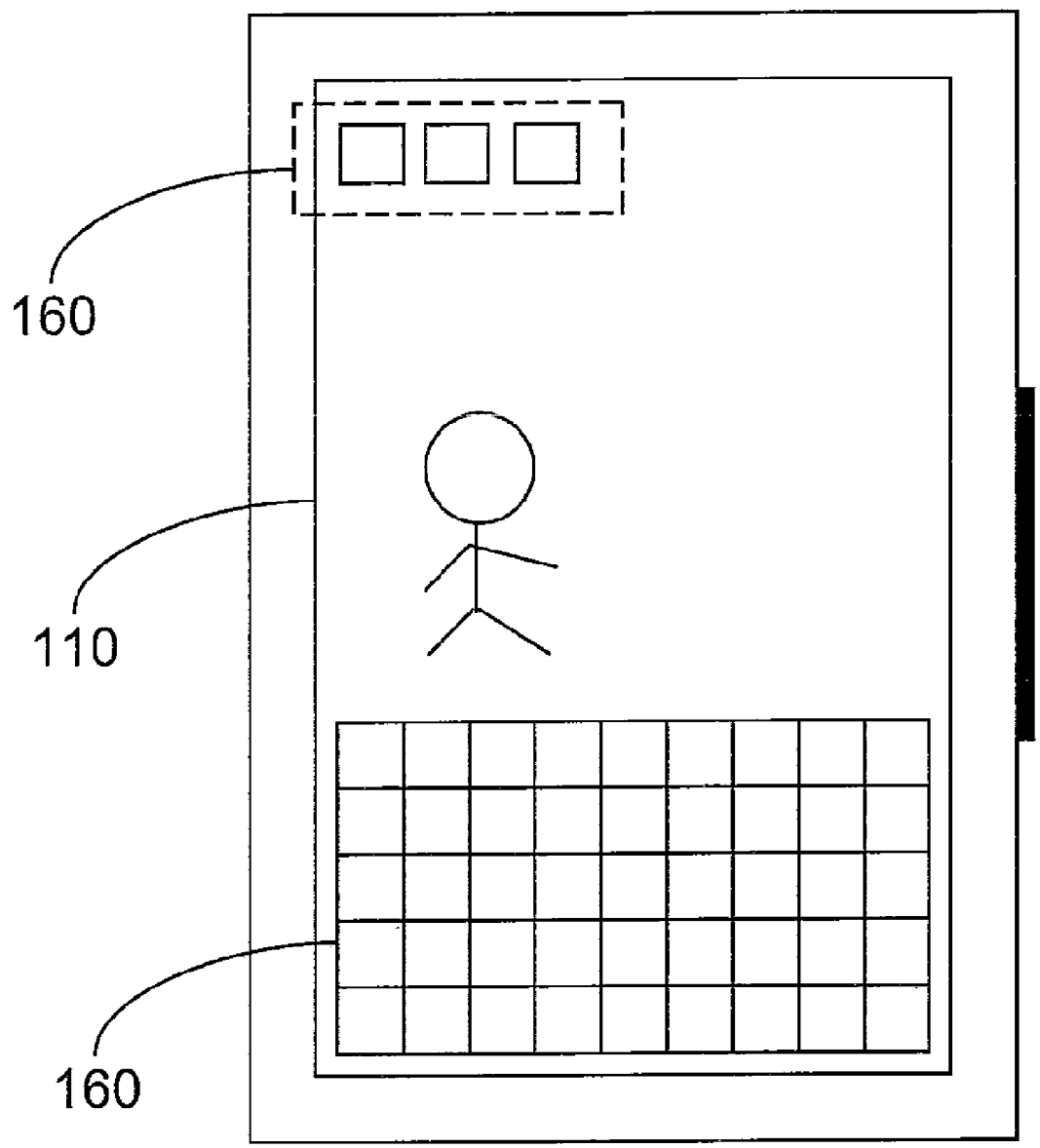
FIG. 4C is a schematic view of the virtual input interface displayed on the tablet PC.

Referring to FIGS. 4A, 4B, and 4C together, a notebook/tablet PC is taken as an example in another embodiment of the present invention. FIG. 4A shows the notebook of this embodiment when being unfolded. The user can fold the display unit, such that the display unit 110 overlaps the original physical input interface 160 from above. As the display unit 110 overlaps the physical input interface 160 from above, the input through the physical input interface 160 is influenced.

Therefore, when the display unit 110 is folded to overlap the physical input interface 160, the embedded control unit 150 will send a trigger signal. The system checks the position of the display unit 110 according to the trigger signal. In this embodiment, provided that the second position indicates that the display unit 110 is unfolded to form the notebook, and the first position indicates that the display unit 110 overlaps the input interface 160 from above. When the display unit 110 switches to the second position, a corresponding program of the virtual input interface is removed from the memory of the electronic device, and a corresponding program of the physical input interface 160 is loaded into the memory unit 140. In addition to the keyboard of FIG. 4A, the physical input interface 160 may also be a volume adjustment key, a brightness adjustment key, or a display switching key.

When the electronic device switches to the first position, a corresponding program of the virtual input interface is executed to display the virtual input interface on the display unit 110. When the display unit 110 switches to the first position, the embedded control unit 150 removes a corresponding program of the original physical input interface 160 from the memory, and loads the virtual input interface of the volume adjustment key, brightness adjustment key, and display switching key into the memory. The virtual input interface on the display unit 110 is as shown in FIG. 4C.

According to the present invention, different trigger signals will be sent to the embedded control unit 150 when the display unit 110 switches between different positions, such that the embedded control unit 150 loads/removes the virtual input interface and its corresponding program into/from the memory unit according to the received trigger signal. In this manner, when the display unit 110 is at the first position, the display unit 110 can display the virtual input interface at once, and the user does not need to trigger other keys or switches. When the display unit 110 is at the second position, the electronic device will remove the virtual input interface and its corresponding program, such that the virtual input interface will not occupy the memory capacity of the electronic device. Moreover, the booting time of the electronic device can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic device that automatically selectively loads and unloads programs respectively enabling the use of a physical input interface and a virtual input interface, the electronic device comprising:
   a display unit, changeable between a first position blocking access to the physical input interface and a second position allowing access to the physical input interface, wherein the display unit sends a first trigger signal at the first position, and sends a second trigger signal at the second position;
   a storage unit, for storing a virtual input interface program that displays the virtual input interface and enables use of the virtual input interface and a physical input interface program that enables use of the physical input interface;
   a memory unit, for loading an operating system, the virtual input interface, and the physical input interface;
   an embedded control unit, electrically connected to the display unit, the storage unit, and the memory unit, for receiving and detecting the first or the second trigger signal sent by the display unit when it changes to a corresponding position; and a management program that is configured to respond to detection of a first trigger signal by loading the virtual input interface program into the memory unit and removing the physical input interface program from the memory unit, and to respond to detection of the second trigger signal by loading the physical input interface program into the memory unit and removing the virtual input interface program from the memory unit;

wherein the electronic device is configured to maintain either the virtual input interface program or the physical input interface program, but not both simultaneously, in the memory unit.

2. The electronic device as claimed in claim 1, wherein the electronic device is a personal digital assistant (PDA), a tablet PC, a cell phone, or a notebook.

3. The electronic device as claimed in claim 1, wherein the display unit is an LCD touch screen.

4. The electronic device as claimed in claim 1, wherein the display unit further comprises a shaft for rotating the position of the display unit.

5. The electronic device as claimed in claim 1, wherein the display unit further comprises a hinge for folding the position of the display unit.

6. The electronic device as claimed in claim 1, wherein the display unit further comprises a slide rail for sliding the position of the display unit.

7. The electronic device according to claim 1, wherein the electronic device is configured to refrain from loading the virtual input interface program into memory during boot up of the electronic device.

8. The electronic device according to claim 1, wherein the embedded control unit is further configured to query an Advanced Configuration Power Interface Basic Input/Output System (ACPI BIOS) to determine whether the display unit is in a standby state or an operating state.

9. The electronic device according to claim 8,
wherein the embedded control unit is further configured to respond to detection of the first or second trigger signal by sending a message to the operating system, and
wherein the management program is configured to receive the message.

10. The electronic device according to claim 9, wherein the management program is configured, in response to the message, to query the ACPI BIOS to determine a current position of the display unit.

11. A method of automatically selectively loading into a memory and removing from the memory programs corresponding to a physical user input interface and a virtual user input interface of an electronic device having a display unit based upon a position of the display unit, wherein the display unit has at least a first position and a second position the method comprising:

executing a management program;
when the display unit is changed to the first position, sending a first trigger signal;
when the display unit is changed to the second position, sending a second trigger signal;
when the display unit switches to the first position, the management program loading into the memory a virtual input interface program that displays a virtual input interface and enables use of the virtual input interface and removing from the memory a physical input interface program that enables use of a physical input interface; and
when the display unit switches to the second position, the management program loading into the memory the physical input interface program, and removing from the memory the virtual input interface program.

12. The method as claimed in claim 11, further comprising:
checking an Advanced Configuration Power Interface of the electronic device to check a current display mode of the electronic device.

13. The method as claimed in claim 11, wherein when the display unit of the electronic device switches to the first or second position, the display unit sends a corresponding trigger signal of the display unit through a trigger switch.

14. The method as claimed in claim 11, wherein the electronic device is a PDA, a tablet PC, a cell phone, or a notebook.

15. The method as claimed in claim 11, further comprising booting up the electronic device without loading the virtual input interface program into memory.

16. The method as claimed in claim 11, further comprising detecting the first and second trigger signals with an embedded control unit electrically connected to the display unit.

17. The method as claimed in claim 16, further comprising the embedded control unit further responding to detection of the first or second trigger signal by querying an ACPI BIOS to determine whether the display unit is in a standby state or an operating state.

18. The method as claimed in claim 17, further comprising:
running an operating system on the electronic device; and
the embedded control unit sending a message to the operating system when it detects a trigger signal.

19. The method as claimed in claim 18, further comprising the management program receiving the message sent by the embedded control unit to the operating system.

20. The method as claimed in claim 19, further comprising the management program, in response to receiving the message, querying an ACPI BIOS to determine a current position of the display unit.

* * * * *